(12) United States Patent
Takashima (10) Patent No.: US 8,169,733 B2
(45) Date of Patent: May 1, 2012

(54) MAGNETIC DISK DEVICE

(75) Inventor: Daisaburo Takashima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 196 days.

(21) Appl. No.: 12/554,453

(22) Filed: Sep. 4, 2009

(65) Prior Publication Data
US 2010/0110580 A1  May 6, 2010

(30) Foreign Application Priority Data
Oct. 31, 2008  (JP) .................... 2008-281199

(51) Int. Cl.
*G11B 21/02* (2006.01)

(52) U.S. Cl. ................. 360/75; 360/53; 711/202

(58) Field of Classification Search .............. None
See application file for complete search history.

(56) References Cited

U.S. PATENT DOCUMENTS

| | | | | |
|---|---|---|---|---|
| 5,822,142 A | * | 10/1998 | Hicken | 360/53 |
| 7,916,421 B1 | * | 3/2011 | Liikanen et al. | 360/77.01 |
| 2002/0091964 A1 | * | 7/2002 | Cheok et al. | 714/6 |
| 2008/0010504 A1 | * | 1/2008 | Hashimoto | 714/6 |

OTHER PUBLICATIONS

Abdullah Al Mamun et al., "Hard Disk Drive," CRC Press, ISBN 0-8493-7253-4, 2007.
Background Art Information, Jan. 2009.

* cited by examiner

*Primary Examiner* — Andrew L Sniezek
(74) *Attorney, Agent, or Firm* — Knobbe, Martens, Olson & Bear, LLP (57) ABSTRACT

A magnetic disk device includes a disk that includes a plurality of tracks and magnetically stores therein data; a magnetic head that reads and writes data on the tracks; a data writing unit that classifies sectors along one track into a plurality of sector groups and writes to a physical address of each of the sector groups data of a logical address that is different from a logical address corresponding to the physical address in same track; and a first nonvolatile memory that stores therein a conversion table of the logical address and the physical address.

16 Claims, 9 Drawing Sheets

LOGICAL-PHYSICAL CONVERSION TABLE 201

(a) SEARCH TABLE 101A

| WriteDone | SOURCE | AFTER CONVERSION |
|---|---|---|
| 1 | TRACK T0 | TRACK T0 |
| 0 | TRACK T1 | TRACK T1→5 |
| 0 | TRACK T2 | TRACK T2 |
| 0 | TRACK T3 | TRACK T3 |
| 1 | TRACK T4 | TRACK T4 |
| 1 | TRACK T5 | TRACK T5→1 |
| 0 | TRACK T6 | TRACK T6 |
| ... | ... | ... |
| 0 | TRACK T7 | TRACK T7 |

(b) REVERSE SEARCH TABLE 101B

| AFTER CONVERSION | SOURCE |
|---|---|
| TRACK T0 | TRACK T0 |
| TRACK T1 | TRACK T1→5 |
| TRACK T2 | TRACK T2 |
| TRACK T3 | TRACK T3 |
| TRACK T4 | TRACK T4 |
| TRACK T5 | TRACK T5→1 |
| TRACK T6 | TRACK T6 |
| ... | ... |
| TRACK T7 | TRACK T7 |

↑

LOGICAL-PHYSICAL CONVERSION TABLE 201

(c) SEARCH TABLE 102A

| WriteDone | SOURCE | AFTER CONVERSION |
|---|---|---|
| 1 | TRACK T0 | TRACK T0 |
| 0 | TRACK T1 | TRACK T1→5→6 |
| 0 | TRACK T2 | TRACK T2 |
| 0 | TRACK T3 | TRACK T3 |
| 1 | TRACK T4 | TRACK T4 |
| 1 | TRACK T5 | TRACK T5→6 |
| 1 | TRACK T6 | TRACK T6→5 |
| ... | ... | ... |
| 0 | TRACK T7 | TRACK T7 |

(d) REVERSE SEARCH TABLE 102B

| AFTER CONVERSION | SOURCE |
|---|---|
| TRACK T0 | TRACK T0 |
| TRACK T1 | TRACK T1→5 |
| TRACK T2 | TRACK T2 |
| TRACK T3 | TRACK T3 |
| TRACK T4 | TRACK T4 |
| TRACK T5 | TRACK T5→1→6 |
| TRACK T6 | TRACK T6→1 |
| ... | ... |
| TRACK T7 | TRACK T7 |

| | WSG0 | WSG1 | WSG2 | WSG3 | WSG4 | WSG5 | WSG6 | WSG7 | Rotate<2> | Rotate<1> | Rotate<0> |
|---|---|---|---|---|---|---|---|---|---|---|---|
| TRACK T0 | 1 | 0 | 0 | 0 | 0 | 0 | 0 | 0 | 0 | 0 | 0 |
| TRACK T1 | 0 | 0 | 0 | 0 | 1 | 1 | 1 | 1 | 0 | 1 | 1 |
| TRACK T2 | 0 | 0 | 0 | 1 | 0 | 0 | 0 | 0 | 0 | 0 | 0 |
| TRACK T3 | 0 | 1 | 1 | 1 | 1 | 1 | 1 | 1 | 1 | 0 | 1 |
| ... | | | | | | | | | | | |
| TRACK TN-1 | 0 | 0 | 0 | 0 | 0 | 0 | 0 | 0 | 0 | 0 | 0 |

MAGNETIC DISK DEVICE

CROSS-REFERENCE TO RELATED APPLICATIONS

This application is based upon and claims the benefit of priority from the prior Japanese Patent Application No. 2008-281199, filed on Oct. 31, 2008; the entire contents of which are incorporated herein by reference.

BACKGROUND OF THE INVENTION

1. Field of the Invention

The present invention relates to a magnetic disk device.

2. Description of the Related Art

In recent years, a magnetic disk device (hard disk drive (HDD)) is used in a large computer, a personal computer (PC), a home electric appliance, a car-mounted navigation system, an information terminal, a mobile phone, and the like. The maximum read/write (R/W) bandwidth in the magnetic disk device is proportional to the number of rotations (rotation speed) of the magnetic disk device and a track density of a disk platter that stores therein data. Specifically, the maximum R/W bandwidth in the magnetic disk device corresponds to a value that is obtained by multiplying a bit density along one track by the number of rotations. For example, in a case of a 1.8-inch HDD spinning at 4200 revolutions per minute (rpm), because the HDD has about 900 sectors, each of which holds 512 bytes (B), in one track, 460 kilobytes (KB) data is recorded in one track. If the HDD rotates at 4200 rpm, data can be read/written at the maximum speed of 32 MB/s (=460 KB×4200/60).

In such HDD, the recording density (bit per inch (bpi)), i.e., data amount written in one inch along a track, is the same between an inner track and an outer track. However, because the inner track has a smaller circumference than the outer track, the number of zones each including a plurality of sectors (the number of zones per one round) is smaller in the inner track than in the outer track. Because the number of rotations is the same between the inner track and the outer track, the maximum bandwidth becomes smaller in the inner track than the outer track. Therefore, the maximum bandwidth of the HDD becomes large as the HDD is increased to 1.8 inches, 2.5 inches, and 3.5 inches in size and as the number of rotations of the HDD is increased to 4200 rpm, 5200 rpm, and 7200 rpm (for example, refer to "Hard Disk Drive Mechatronics and Control" CRC Press ISBN-10:0-8493-7253-4 by Abdullah Al Mamun et al.). In the HDD, if data can be read/written with the maximum bandwidth, the data can be read/written on a disk in a short time.

However, in an operating system (OS), such as Windows (registered trademark) XP, Windows (registered trademark) Vista, and Linux (registered trademark), or the like, the minimum unit of file writing is 4 KB (64 KB at the maximum) in a file format, so that small files are often read/written randomly in a PC. If data is randomly read/written, when data is read/written on a track accompanying a long rotation of the disk over different sectors or in the same sector (movement between tracks over a long distance), the effective R/W bandwidth degrades extremely with respect to the maximum bandwidth. For example, in 1.8 HDD, the seek time is 3 milliseconds (ms) for moving to an adjacent track and is 22 ms for moving from the inner track to the outer track. The average seek time in 1.8 HDD is about 11 ms.

For performing the read/write operation in the same track, the seek time to the sector next to the sector on which the read/write operation was performed is 0 second (s). However, when the disk is rotated half a turn, time loss of 7 ms (=1/(4200/60)/2) occurs. Furthermore, in the worse case in which the read/write operation is performed in a sector of one track before, time loss of 14 ms occurs. For example, when the sum of the seek time and the rotational latency is 8 ms for each 4 KB, the effective R/W bandwidth is 490 KB/s (4 KB/(4 KB/(32 MB/s)+8 ms), so that the performance of the effective R/W bandwidth is dropped to 1/65 of the maximum R/W bandwidth.

As described above, in the conventional technique, when random reading/writing of files of a small size occurs by the operation of the OS or the like, the effective R/W bandwidth degrades substantially from the maximum R/W bandwidth, so that the performance of the read/write operation degrades.

BRIEF SUMMARY OF THE INVENTION

A magnetic disk device according to an embodiment of the present invention comprises: a disk that includes a plurality of tracks and magnetically stores therein data; a magnetic head that reads and writes data on the tracks; a voice coil motor that moves the magnetic head to select an arbitrary track from the tracks; a read/write channel that modulates the data read and written by the magnetic head; a servo control circuit that controls a position of the tracks; a controller that includes a micro processing unit and performs control; an error check and correct circuit that corrects the data; an interface circuit that connects the magnetic disk device to an external device; a data writing unit that classifies sectors along one track into a plurality of sector groups and writes to a physical address of each of the sector groups data of a logical address that is different from a logical address corresponding to the physical address in same track; and a first nonvolatile memory that stores therein a conversion table of the logical address and the physical address.

A magnetic disk device according to an embodiment of the present invention comprises: a disk that includes a plurality of tracks and magnetically stores therein data;

a magnetic head that reads and writes data on the tracks; a voice coil motor that moves the magnetic head to select an arbitrary track from the tracks; a read/write channel that modulates the data read and written by the magnetic head; a servo control circuit that controls a position of the tracks; a controller that includes a micro processing unit and performs control; an error check and correct circuit that corrects the data; an interface circuit that connects the magnetic disk device to an external device; a data writing unit that classifies the tracks into a plurality of track groups and writes to a physical address of each of the track groups data of a logical address in a different track; and a first nonvolatile memory that stores therein a conversion table of the logical address and the physical address.

A magnetic disk device according to an embodiment of the present invention comprises: a disk that includes a plurality of tracks and magnetically stores therein data; a magnetic head that reads and writes data on the tracks; a voice coil motor that moves the magnetic head to select an arbitrary track from the tracks; a read/write channel that modulates the data read and written by the magnetic head; a servo control circuit that controls a position of the tracks; a controller that includes a micro processing unit and performs control; an error check and correct circuit that corrects the data; an interface circuit that connects the magnetic disk device to an external device; a first data writing unit that classifies sectors along one track into a plurality of sector groups and writes to a first physical address of each of the sector groups data of a first logical address that is different from a logical address corresponding to the first physical address in same track; a second data writing unit that classifies the tracks into a plurality of track groups and writes to a second physical address of each of the track groups data of a second logical address in a different track; and a first nonvolatile memory that stores therein a first conversion table of the first logical address and the first physical address and a second conversion table of the second logical address and the second physical address.

DETAILED DESCRIPTION OF THE INVENTION

Exemplary embodiments of a magnetic disk device according to the present invention will be explained below in detail with reference to the accompanying drawings. The present invention is not limited to the following embodiments.

Figure 1:
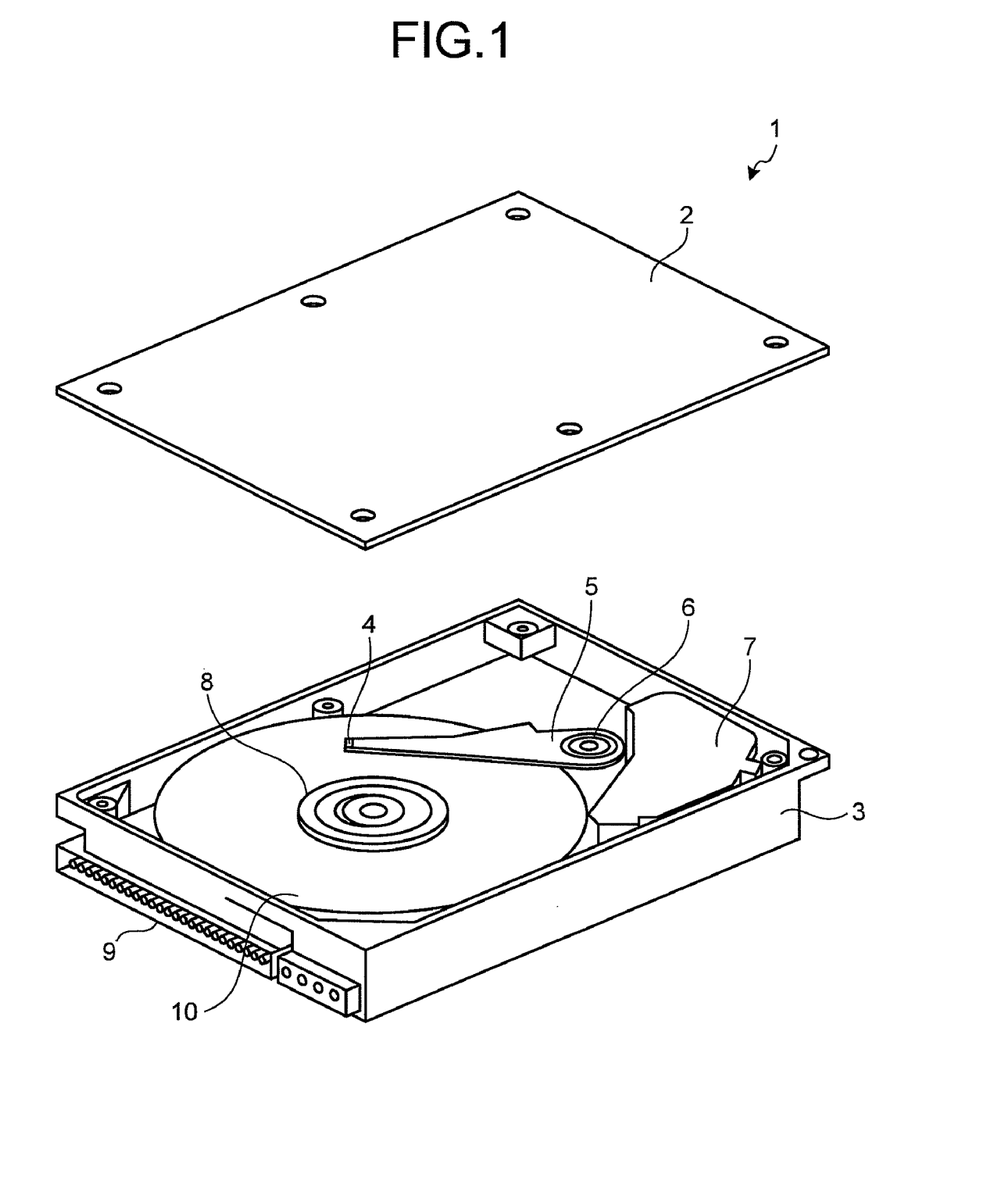
FIG. 1 is a schematic diagram of a configuration of a magnetic disk device according to a first embodiment of the present invention.

FIG. 1 is a schematic diagram of a configuration of a magnetic disk device 1 according to a first embodiment of the present invention. The magnetic disk device 1 includes an approximately circular disk 10 that magnetically stores therein data and a magnetic head (head amp) 4 that reads/writes (R/W) data on a track of the disk 10. The magnetic disk device 1 further includes an actuator arm 5, a pivot 6, a voice coil motor (VCM) 7, a spindle motor 8, and an integrated drive electronics (IDE) connector 9.

The actuator arm 5 has an approximately plate shape, and rotates around the pivot 6 as an axis. The actuator arm 5 includes the magnetic head 4 at an edge opposite to the pivot 6. Therefore, the magnetic head 4 is moved over the disk 10 by rotating the actuator arm 5 around the pivot 6.

The VCM 7 moves the actuator arm 5 to select a predetermined track on the disk 10. The spindle motor 8 rotates the disk 10. The magnetic disk device 1 performs a data read/write operation on the disk 10 at various positions of the disk 10 by relatively changing the positions of the magnetic head 4 and the disk 10. The IDE connector 9 connects the magnetic disk device 1 to an external device.

In the magnetic disk device 1, the disk 10, the magnetic head 4, the actuator arm 5, the pivot 6, the VCM 7, the spindle motor 8, and the IDE connector 9 are stored in a base plate 3, and a top cover 2 is attached to the base plate 3.

The magnetic disk device 1 according to the first embodiment selects a track to which a seek time that is the time to move the magnetic head 4 becomes short and performs the data read/write operation on the disk 10, and manages a physical address of a track on which data is actually written and a logical address of a write instruction while correlating them with each other.

Figure 2:
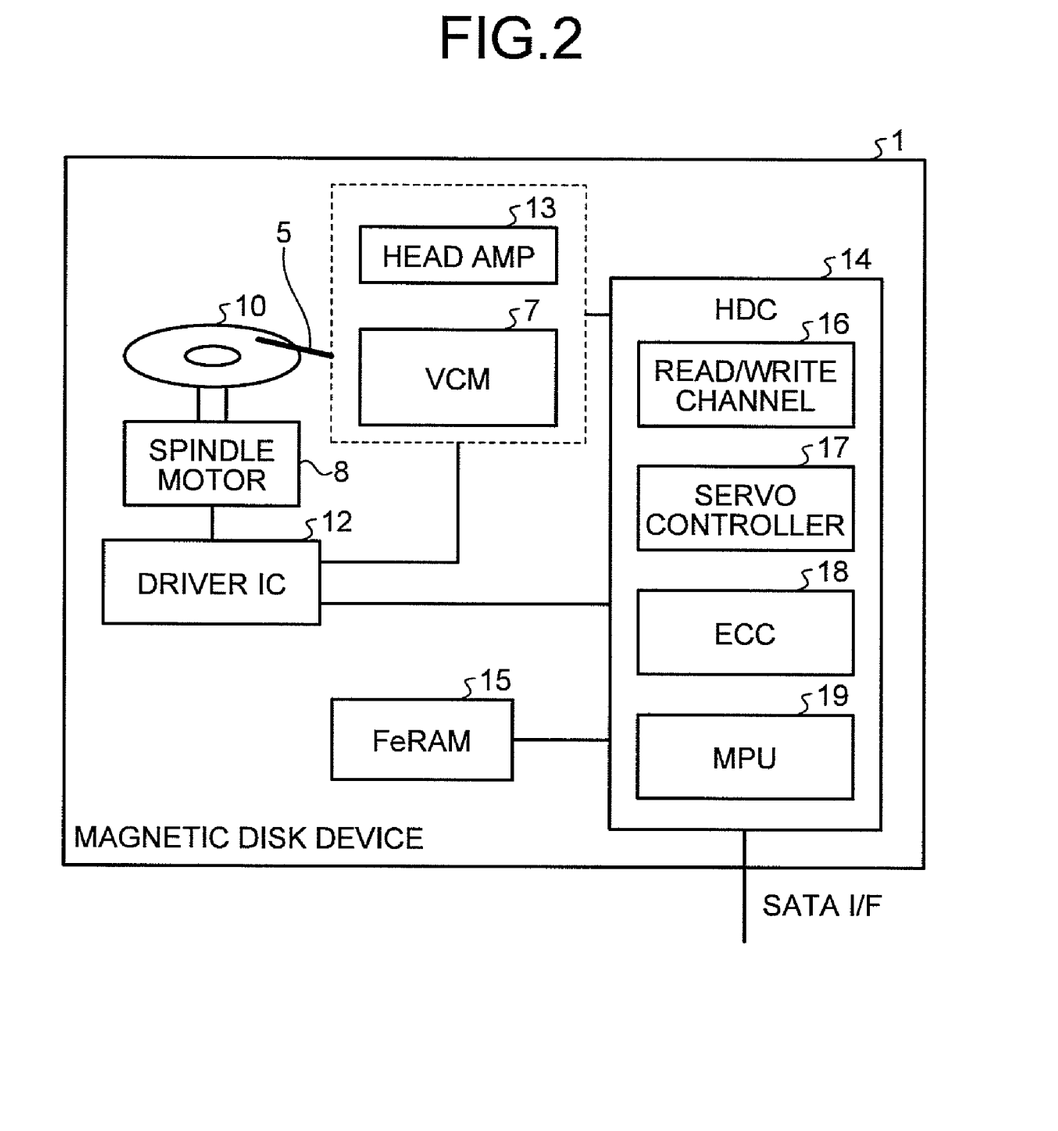
FIG. 2 is a block diagram of a functional configuration of the magnetic disk device.

FIG. 2 is a block diagram of a functional configuration of the magnetic disk device 1. In FIG. 2, the magnetic head 4, the pivot 6, the IDE connector 9, and the base plate 3 are not shown.

The magnetic disk device 1 includes, in addition to the disk 10, the actuator arm 5, the VCM 7, the spindle motor 8, and the like, a driver integrated circuit (driver IC) 12, a head amp 13, a hard disk controller (HDC) 14, an FeRAM 15, and an interface circuit (for example, a serial advanced technology attachment interface (SATA I/F)) to an external device.

The driver IC 12 is connected to the VCM 7, the spindle motor 8, the head amp 13, and the HDC 14, and controls the VCM 7, the spindle motor 8, and the head amp 13 based on an instruction from the HDC 14. The head amp 13 controls the magnetic head 4 based on an instruction from the driver IC 12, and the VCM 7 controls the actuator arm 5 (the pivot 6) based on an instruction from the driver IC 12. The spindle motor 8 controls a spindle based on an instruction from the driver IC 12.

The HDC 14 includes a read/write channel 16 that modulates write data and read data on the disk 10 by the magnetic head 4, a servo control circuit (servo controller) 17 that performs a position control of a track, an error check and correct circuit (ECC) 18 that corrects data, and a micro processing unit (MPU) 19. The HDC 14 is connected to the magnetic head 4, the VCM 7, the driver IC 12, the FeRAM 15, and the SATA I/F.

The MPU 19 searches for a track on which the data read/write operation is to be performed and manages the position for the data read/write operation by using the FeRAM 15. The MPU 19 in the present embodiment, when a data read/write request to the disk 10 is made, searches for a track to which the seek time is the shortest. If valid data has not been written on the searched track, the MPU 19 instructs the driver IC 12 or the like to write data on the searched track or read data from the searched track.

The FeRAM 15 is a ferroelectric memory that has high fatigue resistance with respect to the data read/write operation and is a high-nonvolatile memory (for example, a magnetic random access memory) capable of reading/writing data at high speed. The FeRAM 15 is connected to the HDC 14 and stores a logical-physical conversion table 201 to be described below.

Figure 3A:
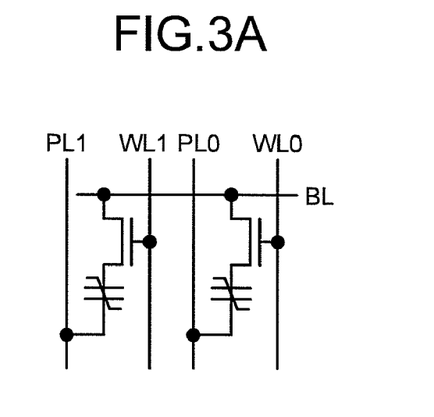
FIG. 3A is a schematic diagram of a first configuration example of a ferroelectric random access memory (FeRAM)
Figure 3B:
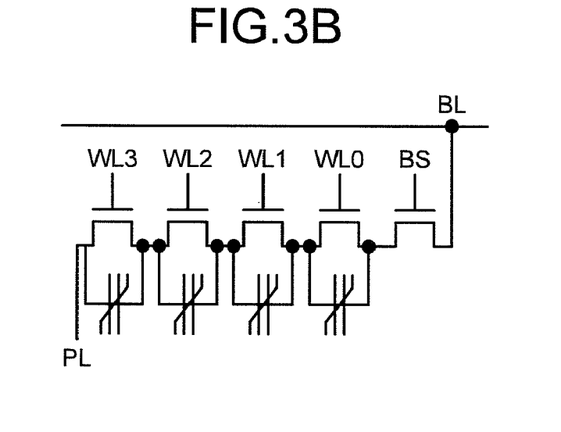
FIG. 3B is a schematic diagram of a second configuration example of the FeRAM.
Figure 3C:
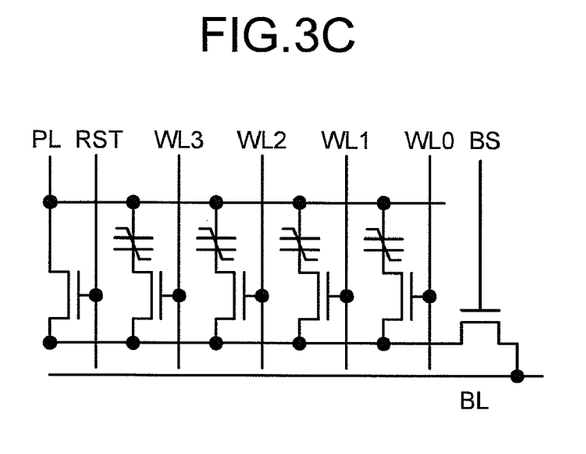
FIG. 3C is a schematic diagram of a third configuration example of the FeRAM.

FIGS. 3A to 3C are schematic diagrams of first to third configuration examples of the FeRAM 15. As shown in FIGS. 3A to 3C, for example, the FeRAM 15 is configured by connecting a ferroelectric substance to a bit line, a plate line, a word line, a block selection line, and the like. In FIGS. 3A to 3C, the plate line is denoted by PL1, PL0, and PL, the word line is denoted by WL0, WL1, WL2, and WL3, the bit line is denoted by BL, the block selection line is denoted by BS, and a reset signal line is denoted by RST.

Figure 4:
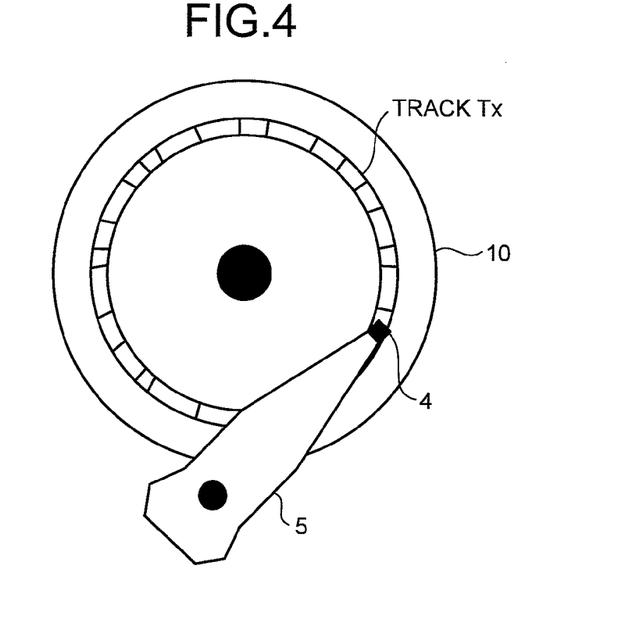
FIG. 4 is a schematic diagram of a disk and a magnetic head of the magnetic disk device.

FIG. 4 is a schematic diagram of the disk 10 and the magnetic head 4. Annular tracks Tx are arranged concentrically on the disk 10, and the magnetic head 4 attached to the tip of the actuator arm 5 performs the data read/write operation on the track Tx. At this time, the disk 10 rotates around the rotation axis thereof and the actuator arm 5 moves in a radial direction of the disk 10 (in a direction from the center to the outer edge and vice versa). Whereby, the magnetic disk device 1 moves the magnetic head 4 to a position at which the data read/write operation is performed on the disk 10.

Figure 5:
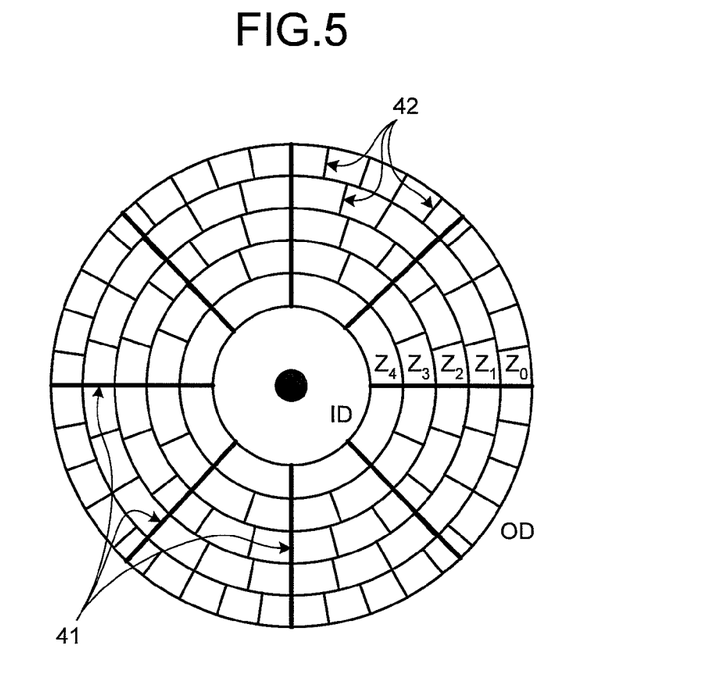
FIG. 5 is a schematic diagram illustrating zone classifications and servo sector areas on the disk.

FIG. 5 is a schematic diagram illustrating zone classifications and servo sector areas on the disk 10. The disk 10 is divided into a plurality of the servo sector areas by servo sector boundaries 41 of which data storage area extends in the radial direction (from an inside diameter (ID) direction to an OD (outside diameter) direction). Moreover, on the disk 10, the tracks Tx are classified into a plurality of zones Z0 to Z4 and the like by data block boundaries 42.

A procedure of the data read/write operation on the disk 10 of the magnetic disk device 1 according to the present embodiment is explained below. The data read operation from the disk 10 and the data write operation to the disk 10 are performed in the similar manner, so that only a procedure of the data write operation to the disk 10 is explained.

Figure 6:
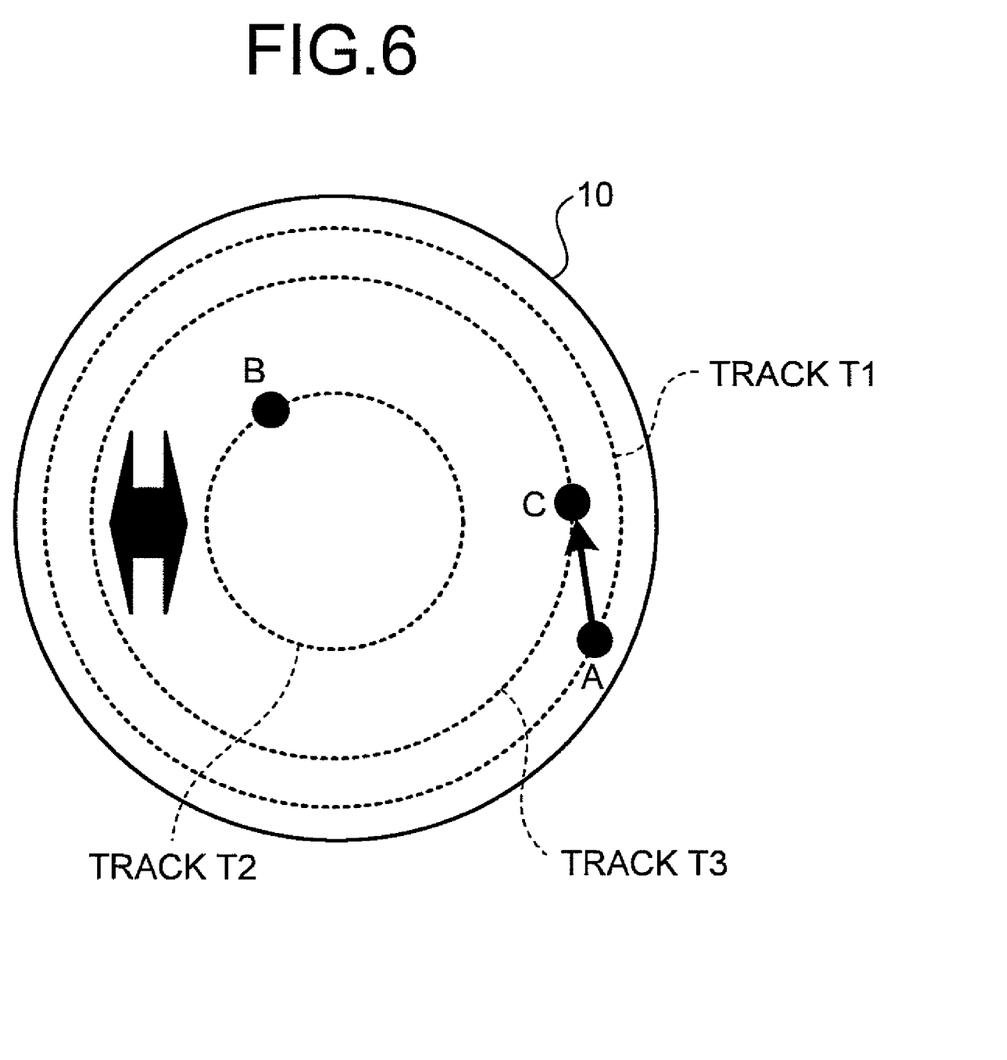
FIG. 6 is a schematic diagram for explaining a procedure of a data write operation to the disk of the magnetic disk device according to the first embodiment.

FIG. 6 is a schematic diagram for explaining the procedure of the data write operation to the disk 10. In FIG. 6, a track T1, a track T3, and a track T2 are arranged in descending order of radius from the outer periphery to the center of the disk 10. For example, a read instruction or a write instruction of data is issued to the disk 10 in the order of a point A on the track T1 and a point B on the track T2. In this case, after performing the data read operation or the data write operation on the point A on the track T1, the write instruction in which a sector of the point B on the track T2 having a radius smaller than the tracks T1 and T3 is an initial address is issued. When such write instruction is issued, in a conventional magnetic disk device, because a logical address corresponds to an actual physical address on the disk 10 one to one, the magnetic head 4 is moved to the sector of the point B on the track T2. Therefore, the seek time to move the magnetic head 4 becomes longer.

In the present embodiment, the MPU 19 first searches for a track (hereinafter, "seek-time shortest track") to which the seek time is the shortest. Furthermore, the MPU 19 checks whether valid data has not been written on the seek-time shortest track. If valid data has not been written, the MPU 19 causes the magnetic head 4 to perform the data write operation on the seek-time shortest track. In other words, the MPU 19 searches for a track to which the seek time is the shortest from among tracks on which valid data has not been written.

For example, when the seek-time shortest track from the track T1 is the track T3, after performing the data write operation or the like on the point A on the track T1, the magnetic disk device 1 writes data, which was supposed to be written on the point B on the track T2, at a position at which a point C on the track T3 is the initial address. Thus, the seek time to move the magnetic head 4 can be shortened significantly.

The magnetic disk device 1 in the present embodiment stores a conversion table (hereinafter, "logical-physical conversion table 201"), in which a physical address of a track on which data is actually written and a logical address of the write instruction are correlated, in the FeRAM 15 in advance to shorten the seek time. Moreover, a table (valid write flag) indicating whether valid data is written on a track on which data is actually written is stored in the FeRAM 15 in advance. Whereby, when the data read operation or the data write operation is performed on all or part of addresses of the data that is written with the point B on the track T2 as the initial address, it is possible to access the point B on the track T2 by referring to the logical-physical conversion table 201 in the FeRAM 15.

Specifically, the MPU 19 registers (overwrites) that data that was supposed to be written on the track T2 is written on the track T3 (the track T2 and the track T3 are switched) in the logical-physical conversion table 201. Thereafter, when the data read request on the track T2 is made, the MPU 19 refers to the logical-physical conversion table 201 to recognize that the data that was supposed to be written on the track T2 is written on the track T3. Whereby, when the data read request on the track T2 is made, the MPU 19 accesses the track T3 to read the data that was supposed to be written on the track T2. When the data write request on the track T3 is made, the MPU 19 accesses the track T2 to write data.

Figure 7:
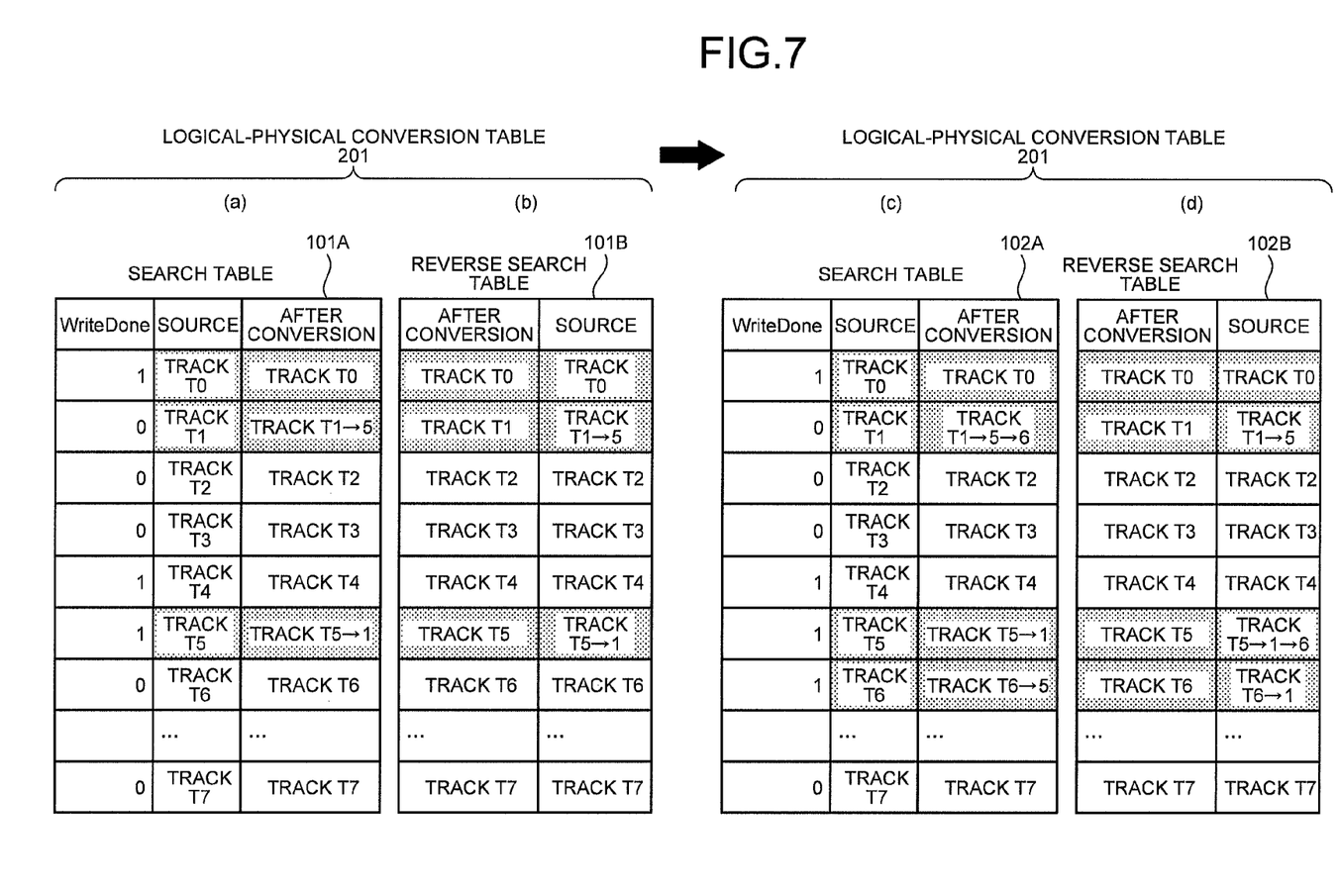
FIG. 7 is a schematic diagram for explaining a logical-physical conversion table according to the first embodiment.

The logical-physical conversion table 201 and usage examples of the logical-physical conversion table 201 (examples of a process of registering a track number in the logical-physical conversion table 201) are explained below. FIG. 7 is a schematic diagram for explaining the logical-physical conversion table 201. The logical-physical conversion table 201, for example, includes a search table and a reverse search table. In FIG. 7, (a) and (c) represent search tables 101A and 102A, respectively, and (b) and (d) represent reverse search tables 101B and 102B, respectively. In the following explanation, the logical-physical conversion table 201 means any one of or all of the search tables 101A and 102A and the reverse search tables 101B and 102B.

Each of the search tables 101A and 102A and the reverse search tables 101B and 102B is an information table in which track numbers (logical addresses of write instructions) of conversion sources and track numbers (physical addresses of tracks on which data is actually written) after conversion are correlated with each other. The search tables 101A and 102A are tables used for searching for a track number after conversion from a track number of a conversion source, in which, for example, track numbers of conversion sources are listed in ascending order from top to bottom. The reverse search tables 101B and 102B are tables used for searching for a track number of a conversion source from a track number after conversion, in which, for example, track numbers after conversion are listed in ascending order from top to bottom. In the present embodiment, the reverse search tables 101B and 102B are stored in the FeRAM 15, so that an actual logical address of a physical address can be easily searched for.

The column "WriteDone" in the search tables 101A and 102A indicates whether valid data is written on a track (valid write flag). If valid data is written on a track, the number "1" is registered. If valid data is not written on a track, the number "0" is registered. A track number of a logical track is registered in a column "source", and a track number (a physical track number in which data is actually written) after address conversion to the logical track is registered in a column "after conversion" in the search tables 101A and 102A and the reverse search tables 101B and 102B.

In the search tables 101A and 102A and the reverse search tables 101B and 102B before use, the same track numbers are registered in the columns "source" and "after conversion", and the number "0" is registered in the column "WriteDone".

When data is written on a track, the number "1" is registered in the track in which the data is written in the column "WriteDone". When the physical address in which data is actually written differs from the logical address of the write instruction, the track numbers registered in the search tables 101A and 102A and the reverse search tables 101B and 102B before use are changed in accordance with the instruction from the MPU 19.

Specifically, the track numbers registered in the column "source" in the search tables 101A and 102A are fixed. In other words, even when the physical address of the write data differs from the logical address of the write instruction, the track numbers registered in the column "source" in the search tables 101A and 102A are not changed. When the physical address of the write data differs from the logical address of the write instruction, the track numbers in the column "after conversion" in the search tables 101A and 102A are changed. On the other hand, the track numbers registered in the column "after conversion" in the reverse search tables 101B and 102B are fixed. In other words, even when the physical address of the write data differs from the logical address of the write instruction, the track numbers registered in the column "after conversion" in the reverse search tables 101B and 102B are not changed. When the physical address of the write data differs from the logical address of the write instruction, the track numbers in the column "source" in the reverse search tables 101B and 102B are changed.

The logical-physical conversion table 201 in FIG. 7 shows a track-number registering process in which data is written on a track T0 and a track T4 at first and second steps, the write instruction to a track T5 is issued at a third step, and the write instruction to a track T6 is issued at a fourth step. Specifically, the search table 101A and the reverse search table 101B show the logical-physical conversion table 201 of a case in which the write instruction to the track T5 is issued at the third step. The search table 102A and the reverse search table 102B show the logical-physical conversion table 201 of a case in which the write instruction to the track T6 is issued at the fourth step.

When the data is written on the tracks T0 and the track T4 at the first and second steps, if the physical address in which the data is actually written is the same as the logical address of the write instruction, the track numbers in the columns "source" and "after conversion" in the logical-physical conversion table 201 are not changed. At this time, the number "1" is registered in the track T0 and the track T4 in the column "WriteDone" in the search table 101A. In other words, if the logical address is the same as the physical address by chance, the track number in the logical-physical conversion table is not changed and only the number in the column "WriteDone" is changed from the number "0" to the number "1".

When the write instruction to the track T5 is issued at the third step, the logical-physical conversion table 201 is changed as the search table 101A and the reverse search table 101B. For example, when the write instruction to the track T5 is issued, if the seek-time shortest track is the track T1, the MPU 19 performs the following processes (1) to (5). In the following explanation, the physical track and the logical track of a track Tn (n is a natural number) are expressed as a physical track Tn and a logical track Tn, respectively.

(1) The MPU 19 refers to the reverse search table 101B and performs a reverse search (searching for the "source" from the "after conversion") for a logical block of a physical track T1 that is the seek-time shortest track to derive a logical track T1. Specifically, the MPU 19 searches for the physical track T1 from the reverse search table 100B and extracts the logical track T1 as the logical track corresponding to the physical track T1.

(2) The MPU 19 refers to the search table 101A and performs a forward search (searching for the "after conversion" from the "source") for a physical block of a logical track T5 to which the write instruction is issued. Then, the MPU 19 registers (overwrites) the physical track T1 that is the seek-time shortest track to the physical track corresponding to the logical track T5. Specifically, the MPU 19 searches for the logical track T5 from the search table 101A and registers the physical track T1 to the physical track corresponding to the logical track T5. Consequently, the physical track T1 is registered to the physical track of the logical track T5 in which the physical track T5 was registered.

(3) The MPU 19 refers to the search table 101A and performs the forward search for the physical address of the logical track T1 derived at (1). Then, the MPU 19 registers the physical track T5 to which the write instruction is issued to the physical track corresponding to the logical track T1. In other words, the MPU 19 inputs the physical track T5 to which the write instruction is actually issued to the physical track corresponding to the logical track (the track T1) derived at (1) by performing the forward search of the search table 101A. Consequently, the physical track T5 is registered to the physical track of the logical track T1 in which the physical track T1 was registered.

(4) The MPU 19 refers to the reverse search table 101B and performs the reverse search for the logical track of the physical track T1 on which data is actually written. Then, the MPU 19 inputs the logical track T5 to which the write instruction is issued to the logical track of the physical track T1 on which data is actually written. Consequently, the logical track T5 is registered to the logical track of the physical track T1 in which the logical track T1 was registered.

(5) The MPU 19 refers to the reverse search table 101B and performs the reverse search for the logical track of the physical track T5 to which the write instruction is issued. Then, the MPU 19 inputs the logical track T1 derived at (1) to the logical track of the physical track T5 to which the write instruction is issued. Consequently, the logical track T1 is registered to the logical track of the physical track T5 in which the logical track T5 was registered. The number "1" is registered for the logical track T5 in the column "WriteDone".

At the third step, the tracks T1 and T5 are simply switched. When the track switching is performed in the similar manner at the fourth step, the track switching can be performed in a short time by using the reverse search table.

When the write instruction to the track T6 is issued at the fourth step, if the seek-time shortest track is the track T5, the MPU 19 performs the following processes (6) to (10).

(6) The MPU 19 refers to the reverse search table 102B and performs the reverse search for the logical track of the physical track T5 that is the seek-time shortest track to derive the logical track T1.

(7) The MPU 19 refers to the search table 102A and performs the forward search for the physical block of the logical track T6 to which the write instruction is issued. Then, the MPU 19 registers (changes) the physical track T5 that is the seek-time shortest track to the physical track corresponding to the logical track T6. Consequently, the physical track T5 is registered to the physical track of the logical track T6 in which the physical track T6 was registered.

(8) The MPU 19 refers to the search table 102A and performs the forward search for the physical address of the logical track T1 derived at (6). Then, the MPU 19 registers the physical track T6 to which the write instruction is issued to the physical track corresponding to the logical track T1. Consequently, the physical track T6 is registered to the physical track of the logical track T1 in which the physical track T5 was registered.

(9) The MPU 19 refers to the reverse search table 102B and performs the reverse search for the logical track of the physical track T5 on which data is actually written. Then, the MPU 19 inputs the logical track T6 to which the write instruction is issued to the logical track of the physical track T5 on which data is actually written. Consequently, the logical track T6 is registered to the logical track of the physical track T5 in which the logical track T1 was registered.

(10) The MPU 19 refers to the reverse search table 102B and performs the reverse search for the logical track of the physical track T6 to which the write instruction is issued. Then, the MPU 19 inputs the logical track T1 derived at (6) to the logical track of the physical track T6 to which the write instruction is issued. Consequently, the logical track T1 is registered to the logical track of the physical track T6 in which the logical track T6 was registered. The number "1" is registered for the logical track T6 in the column "WriteDone".

Consequently, the data for which the write instruction to the logical track T6 is issued is written in the physical track T5, and the data for which the write instruction to the logical track T5 is issued is written in the physical track T1. Therefore, when the write instruction to the logical track T1 is issued hereafter, data is written on the physical track T6 by default. In this manner, because a correspondence relationship between the logical tracks and the physical tracks is registered in the logical-physical conversion table 201, the track switching can be performed.

Accordingly, even when the distance to move the magnetic head 4 is long (the actual physical position is far) and therefore the seek time becomes long, the magnetic disk device 1 writes data in a physical address to which the seek time is short with respect to a physical address to which the write request is made. Moreover, a conversion table (the logical-physical conversion table 201) of a logical address of the write instruction and the physical address to which the seek time is short is stored in the FeRAM 15, so that a process of managing a data write position can be performed at high speed.

When data that continues over a plurality of sectors is written on the disk 10, the correspondence relationship between the physical address and the logical address can be different over the sectors. The continuous data can be divided into a plurality of pieces of data, and each piece of data can be written in order from a track to which the seek time is shorter. Alternatively, the continuous data can be written on a plurality of continuous seek-time shortest tracks on which whole continuous data can be continuously written.

In the magnetic disk device 1, the FeRAM 15 that is a high-speed nonvolatile memory such as a ferroelectric memory can be used as a nonvolatile cache. Whereby, as a flush-cache command, when an instruction to save data from a conventional volatile dynamic RAM (DRAM) to a nonvolatile disk is issued from an operating system (OS), if the cache is nonvolatile, the cache need not be cleared, enabling to improve a hit rate of the cache and an effective R/W bandwidth.

In the present embodiment, explanation is given for a case in which the logical-physical conversion table 201 is stored in the FeRAM 15; however, the logical-physical conversion table 201 can be stored in a memory or the like other than the FeRAM 15 so long as it is a nonvolatile memory on which the data read/write operation can be performed at high speed. Alternatively, the logical-physical conversion table 201 can be stored in a volatile memory.

According to the first embodiment, the data read/write operation is performed by selecting a track to which the seek time is short, so that the seek time can be shortened significantly compared with a conventional magnetic disk device. Moreover, the data read/write operation is performed on the disk 10 while storing the logical-physical conversion table 201 in the FeRAM 15, so that a process of managing a position to read/write data on the disk 10 can be performed in a short time. Thus, data can be read/written on the disk 10 at high speed.

A second embodiment is explained below with reference to FIGS. 8 to 11. In the second embodiment, the data read/write operation is performed by selecting a sector (sector group) from which the time to rotate the disk 10 is shorter, and a physical address of a sector group on which data is actually written and a logical address of a sector group of the write instruction are correlated with each other to be managed. The magnetic disk device 1 in the present embodiment has the same configuration as that in the first embodiment, so that explanation thereof is omitted.

Figure 8:
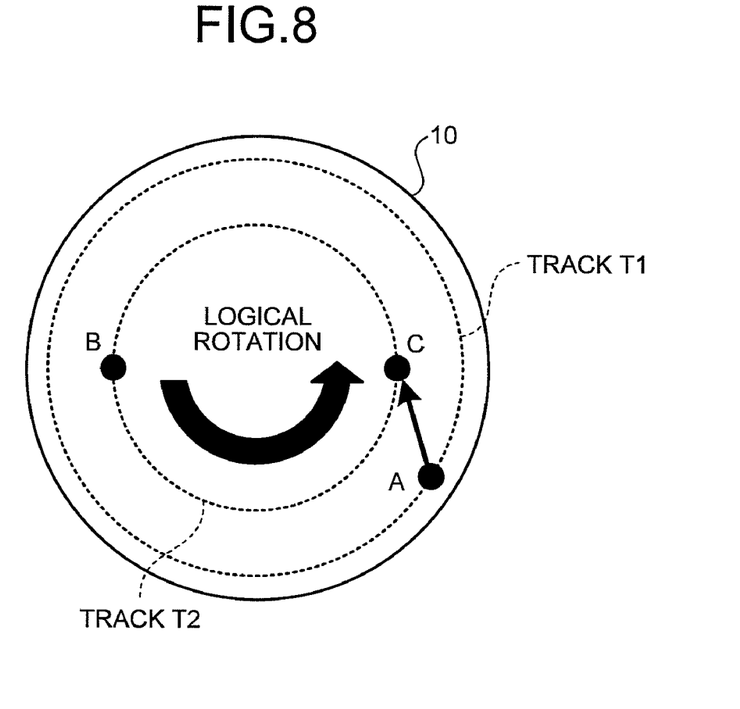
FIG. 8 is a schematic diagram for explaining a data write operation on a disk of a magnetic disk device according to a second embodiment of the present invention.

FIG. 8 is a schematic diagram for explaining the data write operation on the disk 10 of the magnetic disk device 1 according to the second embodiment. In FIG. 8, a track T1 and a track T2 are arranged in descending order of the radius from the outer periphery to the center of the disk 10. Furthermore, the distance from a point A on the track T1 to a point B on the track T2 is larger than the distance from the point A on the track T1 to a point C on the track T2.

For example, the read instruction or the write instruction is issued to the disk 10 in the order of the point A on the track T1 and the point B on the track T2. In this case, after performing the data read operation or the data write operation on the point A on the track T1, the write instruction in which a sector of the point B that is farther from the point A than the point C is an initial address is issued.

When such write instruction is issued, in a conventional magnetic disk device, because a logical address corresponds to an actual physical address on the disk 10 one to one, the magnetic head 4 is moved to the sector of the point B on the track T2. Therefore, it takes a long disk rotation time (long rotational latency to rotate the disk 10) to move the magnetic head 4 to the point B by rotating the disk 10.

Figure 9:
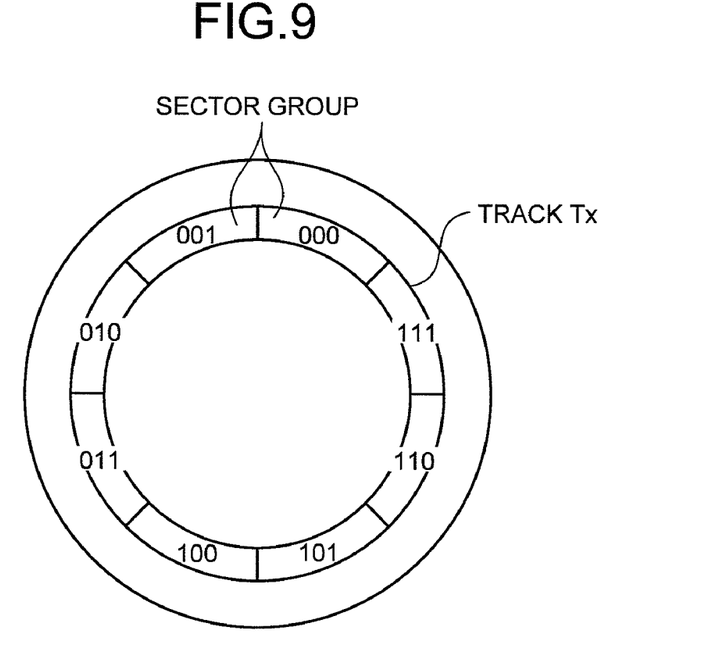
FIG. 9 is a schematic diagram illustrating a track divided into sector groups.

In the present embodiment, as shown in FIG. 9, all sectors in the track Tx are classified into a plurality of sector groups. FIG. 9 is a schematic diagram illustrating the track Tx divided into eight sector groups ("000" to "111"). Specifically, the eight sector groups are arranged counterclockwise in the order of a sector group "000", a sector group "001", a sector group "010", a sector group "101", a sector group "100", a sector group "101", a sector group "110", and a sector group "111". In the present embodiment, the MPU 19 searches for a sector group (hereinafter, "rotational-latency shortest sector group") from which the rotational latency is the shortest. Furthermore, the MPU 19 checks whether valid data has not been written on the searched rotational-latency shortest sector group. If valid data has not been written, the MPU 19 causes the magnetic head 4 to perform the data write operation on the rotational-latency shortest sector group.

For example, when the rotational-latency shortest sector group is the sector group "111" (point C) although the physical address of write request data is the sector group "010" (point B), the data, which was supposed to be written at the point B, is written on the disk 10 with the sector group "111" (point C) as the initial address. Thus, the rotational latency can be shortened significantly.

The magnetic disk device 1 in the present embodiment stores a conversion table (hereinafter, "logical-physical conversion table 202"), in which a physical address (address of a physical sector group) of a sector group on which data is actually written and a logical address (address of a logical sector group) of a sector group to which the write instruction is issued are correlated, in the FeRAM 15 in advance to shorten the rotational latency. Moreover, a table (valid write flag) indicating whether valid data is written on a sector group on which data is actually written is stored in the FeRAM 15 in advance. Whereby, when the data read operation or the data write operation is performed on all or part of addresses of the data that is written with the point B on the track T2 as the initial address, it is possible to access the point C on the track T2 by referring to the logical-physical conversion table 202 in the FeRAM 15.

Specifically, the MPU 19 registers (overwrites) that data that was supposed to be written on the sector group of the point B is written on the sector group of the point C in the logical-physical conversion table 202. Thereafter, when the data read request on the point B is issued, the MPU 19 refers to the logical-physical conversion table 202 to recognize that the data that was supposed to be written on the point B is written on the point C. Whereby, the MPU 19 accesses the point C to read the data that was supposed to be written on the point B. When the data write request on the point C is made, the MPU 19 refers to the logical-physical conversion table 202 to recognize that the data that was supposed to be written on the point C is written on the point B. Whereby, the MPU 19 accesses the point B to write the data that was supposed to be written on the point C.

Figure 10:
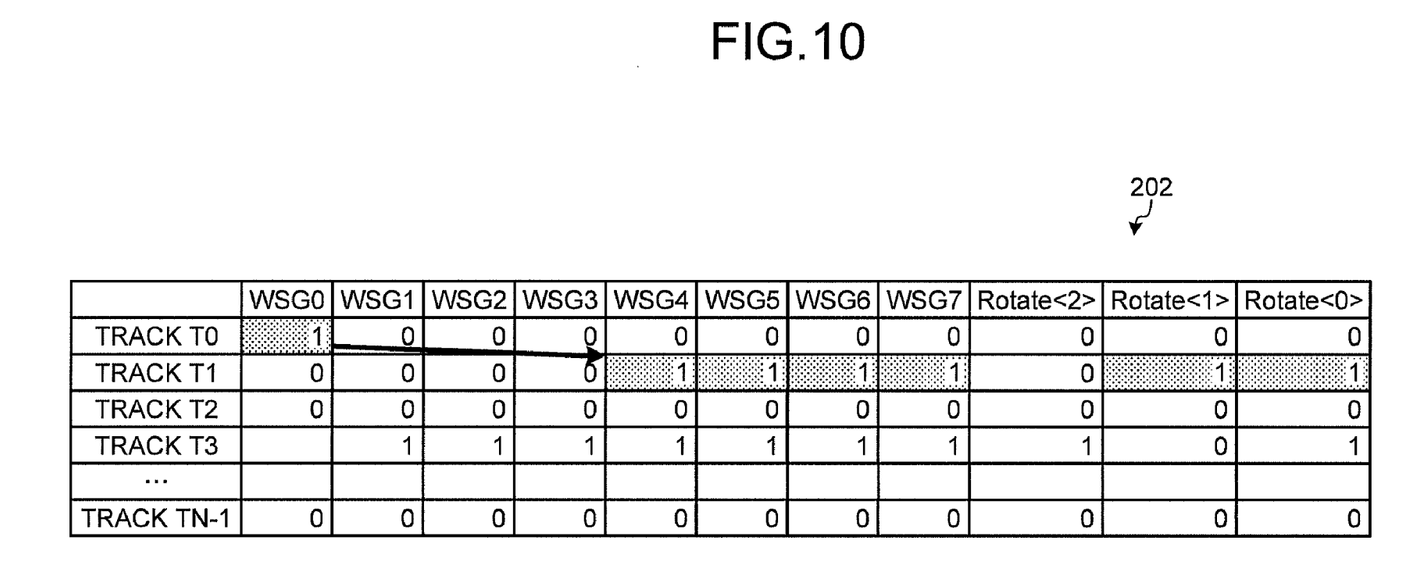
FIG. 10 is a schematic diagram for explaining logical-physical conversion table according to the second embodiment.

The logical-physical conversion table 202 and usage examples of the logical-physical conversion table 202 are explained below. FIG. 10 is a schematic diagram for explaining the logical-physical conversion table 202. Each row (tracks T0 to TN−1) (N is a natural number corresponding to the number of all tracks on the disk 10) of the logical-physical conversion table 202 represents a track position (position of a sector group).

Each column of the logical-physical conversion table 202 represents whether valid data is written on each of logical sector groups WSG0 to WSG7. For example, if valid data is written on a logical sector group, the number "1" is registered, and if valid data is not written on a logical sector group, the number "0" is registered. "WSG0" corresponds to the logical sector group "000", "WSG1" corresponds to the logical sector group "001", "WSG2" corresponds to the logical sector group "010", "WSG3" corresponds to the logical sector group "011", "WSG4" corresponds to the logical sector group "100", "WSG5" corresponds to the logical sector group "101", "WSG6" corresponds to the logical sector group "110", and "WSG7" corresponds to the logical sector group "111".

"Rotate<2>", "Rotate<1>", and "Rotate<0>" are registers representing a logical rotation amount of the disk 10 with respect to the addresses of the divided eight logical sector groups. "Rotate<2,1,0>" represents the rotation amount of the disk 10 in binary. For example, "001" representing ⅛ rotation of the disk 10 can be expressed by "Rotate<2>"=0, "Rotate<1>"=0, and "Rotate<0>"=1, and "111" representing ⅞ rotation of the disk 10 can be expressed by "Rotate<2>"=1, "Rotate<1>"=1, and "Rotate<0>"=1.

For example, it is explained of a case in which the data read request to the logical sector groups WSG4 to WSG7 of the track T1 is made after the data read/write operation is performed on the sector group WSG0 of the track T0. In this case, because the rotational-latency shortest sector group is the sector group WSG1 next to the sector group WSG0, the disk 10 is assumed to rotate by "011" in binary (logically, ⅜ rotation of the disk 10) and data is actually written on the sector groups WSG1 to WSG4. Then, the logical rotation amount of "011" is stored in Rotation<2>, Rotation<1>, and Rotation <0> in the logical-physical conversion table 202, and the number "1" is registered in the logically write effective areas (WSG4 to WSG7).

Whereby, when there is the data read/write operation performed on the sector group WSG2, desired data can be obtained by accessing the sector group WSG5 to which the disk 10 is rotated by "011" from the sector group WSG2 based on the logical rotation amount of "011".

In order to minimize the rotational latency for each sector group, it is possible to optimize the position of the sector group on which the data read/write operation is performed for each data read/write instruction and generate the logical-physical conversion table 202 for each sector group. In this case, the sector groups are switched in one track. Then, the physical address of the sector group in which the data is actually written and the logical address of the sector group to which the write instruction is issued are registered in the logical-physical conversion table 202 while being correlated with each other. As described in the present embodiment, when there is no valid write data in a track, the disk can be logically rotated so that the rotational latency is minimal with respect to the sector groups in one track. In other words, the physical address and the logical address can be registered in the logical-physical conversion table 202 so that they are logically rotated (loops do not match as a whole) with respect to the whole sector groups in one track.

The magnetic disk device 1 can perform a process in which the processes explained in the first embodiment and the present embodiment are combined. For example, the MPU 19 writes valid data on the rotational-latency shortest sector group on the seek-time shortest track. In other words, the MPU 19 can select a physical track and a physical sector group in which the sum of the seek time and the rotational latency is minimal and write data thereon. Whereby, the seek time and the rotational latency of the disk 10 to move to a desired sector in a track of the disk 10 can be reduced significantly compared with a conventional magnetic disk device.

In the present embodiment, each track Tx is divided into eight sector groups; however, each track Tx can be divided into 4, 2, 16, or any other number of sector groups. In the magnetic disk device 1 in the present embodiment, the FeRAM 15 can be a nonvolatile cache as described in the first embodiment.

Accordingly, the bandwidth rate for data reading and data writing is improved compared with a conventional magnetic device by performing the logical rotation (sector group switching) in the present embodiment or the track switching in the first embodiment. Particularly, the bandwidth rate can be substantially improved compared with a conventional magnetic device by performing both of the logical rotation and the track switching. If the number of data-written tracks or data-written sectors is small, the bandwidth rate of the data reading and data writing can be substantially improved. If the used capacity of the disk 10 is high, the effect of improving the data read/write speed becomes small; however, the average read/write bandwidth in lifetime of the magnetic disk device 1 is improved.

The effect of improving the bandwidth becomes small as the number of data-written tracks or data-written sectors increases. However, if valid writable areas are maintained constant by receiving information about an invalid sector or an invalid track, the effect of improving the bandwidth can be maintained.

According to the second embodiment, because the data read/write operation is performed by selecting a sector group from which the rotational latency of the disk 10 is short, it is possible to substantially reduce the time to rotate the disk 10 for the data read/written operation compared with a conventional magnetic device. Moreover, the data read/write operation is performed on the disk 10 while storing the logical-physical conversion table 202 in the FeRAM 15, so that a process of managing a position to read/write data on the disk 10 can be performed in a short time. Thus, data can be read/written on the disk 10 at high speed.

A third embodiment is explained below with reference to FIG. 11. In the third embodiment, a valid write flag of a track or a sector, which has become unnecessary, is cleared based on an address and a size of unnecessary data.

Figure 11:
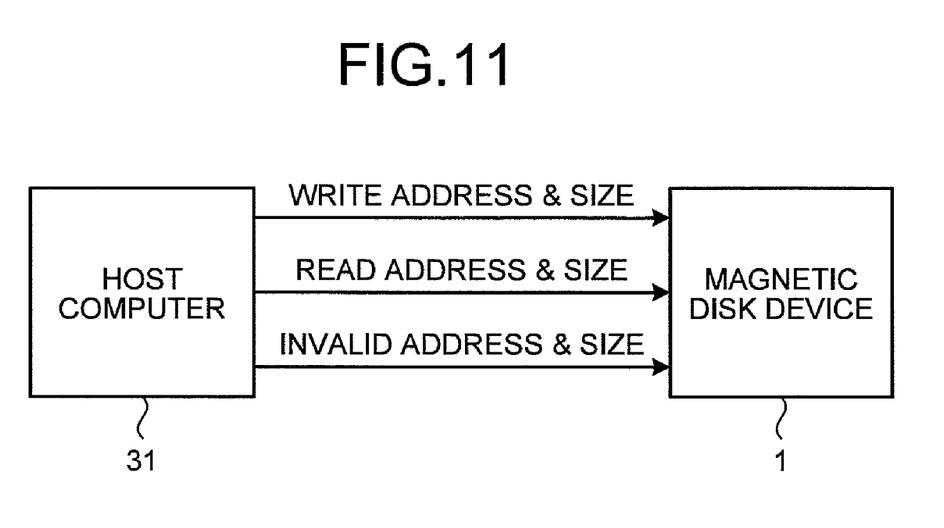
FIG. 11 is a schematic diagram for explaining exchange of data and an instruction between a magnetic disk device and a host computer according to a third embodiment of the present invention.

FIG. 11 is a schematic diagram for explaining exchange of data and an instruction between the magnetic disk device 1 and a host computer 31 according to the third embodiment. The magnetic disk device 1 in the third embodiment has the same configuration as that in the first and second embodiments, so that explanation thereof is omitted.

The host computer 31 sends an address in which data is to be written and a size of the write data (write address & size), an address from which data is to be read and a size of the read data (read address & size), and an address and a size of unnecessary data (invalid address & size).

In the magnetic disk device 1, if the used capacity rate of the disk 10 becomes high, the effect of improving the data read/write speed becomes small. Moreover, if the data, which is actually invalid data on the OS side, is written on a track or a sector, the effect of shortening the seek time and the rotational latency becomes small. This is because in the track switching (changing) method or the sector group switching (changing) method using the logical-physical conversion table 202 of tracks or sectors, if there is write data in a track or a sector, movement of the data or the like occurs.

Therefore, in the present embodiment, the host computer 31 sends an address and a size (invalid address & size) of data, which has become unnecessary on the OS side through a process of deleting a file or the like (data that is no longer the valid write data), to the magnetic disk device 1. The magnetic disk device 1 includes a receiving unit (not shown), which receives the "invalid address & size" from the host computer 31. The magnetic disk device 1 clears the valid write flag of a track or a sector that has become unnecessary based on the "invalid address & size". Whereby, the effect of shortening the seek time and the rotational latency can be maintained. In the magnetic disk device 1 in the present embodiment, the FeRAM 15 can be a nonvolatile cache as described in the first embodiment.

According to the third embodiment, because the valid write flag of a track or a sector that has become unnecessary is cleared, the effect of shortening the seek time and the rotational latency can be maintained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disk device comprising:
    a disk that includes a plurality of tracks and magnetically stores therein data;
    a magnetic head that reads and writes data on the tracks;
    a voice coil motor that moves the magnetic head to select an arbitrary track from the tracks;
    a read/write channel that modulates the data read and written by the magnetic head;
    a servo control circuit that controls a position of the tracks;
    a controller that includes a micro processing unit and performs control;
    an error check and correct circuit that corrects the data;
    an interface circuit that connects the magnetic disk device to an external device;
    a data writing unit that classifies sectors along one track into a plurality of sector groups and writes to a physical address of each of the sector groups data of a logical address that is different from a logical address corresponding to the physical address in same track;
    a first nonvolatile memory that stores therein a conversion table of the logical address and the physical address;
    a second nonvolatile memory that stores therein a data valid flag that indicates whether the data written on the disk is valid data;
    an input unit that receives a write invalid command, which indicates that the data written on the disk is already invalid, and address and size indicating an effective range of the write invalid command, from an external interface; and
    a changing unit that changes the data valid flag based on the write invalid command and the address and size.

2. The magnetic disk device according to claim 1, wherein any one of the first nonvolatile memory and the second nonvolatile memory stores therein any one of write data from outside and read data from the disk.

3. The magnetic disk device according to claim 1, wherein the data write unit writes the data at a position from which a rotational latency of the disk is minimal when writing the data.

4. The magnetic disk device according to claim 1, wherein the data write unit writes to the physical address of each of the sector groups the data of the logical address that is different from the logical address corresponding to the physical address in the same track by switching a position of the sector groups in the same track.

5. The magnetic disk device according to claim 1, wherein
    the data write unit, when there is no valid write data in a track, writes the data at a position at which a logical address of the track is logically rotated so that a rotational latency of the disk is minimal, and
    the first nonvolatile memory stores therein the conversion table by logically rotating a relationship between the physical address and the logical address with respect to the sector groups along the track.

6. The magnetic disk device according to claim 1, wherein the first nonvolatile memory is a ferroelectric random access memory.

7. A magnetic disk device comprising:
    a disk that includes a plurality of tracks and magnetically stores therein data;
    a magnetic head that reads and writes data on the tracks;
    a voice coil motor that moves the magnetic head to select an arbitrary track from the tracks;
    a read/write channel that modulates the data read and written by the magnetic head;
    a servo control circuit that controls a position of the tracks;
    a controller that includes a micro processing unit and performs control;
    an error check and correct circuit that corrects the data;
    an interface circuit that connects the magnetic disk device to an external device;
    a data writing unit that classifies the tracks into a plurality of track groups and writes to a physical address of each of the track groups data of a logical address in a different track;
    a first nonvolatile memory that stores therein a conversion table of the logical address and the physical address; and a second nonvolatile memory that stores therein a data valid flag that indicates whether the data written on the disk is valid data;

an input unit that receives a write invalid command, which indicates that the data written on the disk is already invalid, and address and size indicating an effective range of the write invalid command, from an external interface; and a changing unit that changes the data valid flag based on the write invalid command and the address and size.

8. The magnetic disk device according to claim 7, wherein any one of the first nonvolatile memory and the second nonvolatile memory stores therein any one of write data from outside and read data from the disk.

9. The magnetic disk device according to claim 7, wherein the data write unit writes the data at a position at which a seek time that is time to move the magnetic head is minimal when writing the data.

10. The magnetic disk device according to claim 9, wherein the data write unit, when writing continuous data that continues over a plurality of sectors on the disk, divides the continuous data into a plurality of pieces of data and writes divided data in order from a track group to which the seek time is shorter.

11. The magnetic disk device according to claim 9, wherein the data write unit, when writing continuous data that continues over a plurality of sectors on the disk, writes the continuous data on a track group on which the continuous data is writable continuously and the seek time is short.

12. The magnetic disk device according to claim 7, wherein the first nonvolatile memory is a ferroelectric random access memory.

13. A magnetic disk device comprising:

a disk that includes a plurality of tracks and magnetically stores therein data;

a magnetic head that reads and writes data on the tracks;

a voice coil motor that moves the magnetic head to select an arbitrary track from the tracks;

a read/write channel that modulates the data read and written by the magnetic head;

a servo control circuit that controls a position of the tracks;

a controller that includes a micro processing unit and performs control;

an error check and correct circuit that corrects the data;

an interface circuit that connects the magnetic disk device to an external device;

a first data writing unit that classifies sectors along one track into a plurality of sector groups and writes to a first physical address of each of the sector groups data of a first logical address that is different from a logical address corresponding to the first physical address in same track;

a second data writing unit that classifies the tracks into a plurality of track groups and writes to a second physical address of each of the track groups data of a second logical address in a different track;

a first nonvolatile memory that stores therein a first conversion table of the first logical address and the first physical address and a second conversion table of the second logical address and the second physical address;

a second nonvolatile memory that stores therein a data valid flag that indicates whether the data written on the disk is valid data;

an input unit that receives a write invalid command, which indicates that the data written on the disk is already invalid, and address and size indicating an effective range of the write invalid command, from an external interface; and a changing unit that changes the data valid flag based on the write invalid command and the address and size.

14. The magnetic disk device according to claim 13, wherein any one of the first nonvolatile memory and the second nonvolatile memory stores therein any one of write data from outside and read data from the disk.

15. The magnetic disk device according to claim 13, wherein the first data write unit and the second data write unit write the data at a position at which a sum of a rotational latency of the disk and a seek time that is time to move the magnetic head is minimal when writing the data.

16. The magnetic disk device according to claim 13, wherein the first nonvolatile memory is a ferroelectric random access memory.

* * * * *